April 14, 1959  A. J. GRANATA  2,881,571
REMOVING FINS FROM MOLDED PRODUCTS
Filed Oct. 18, 1955
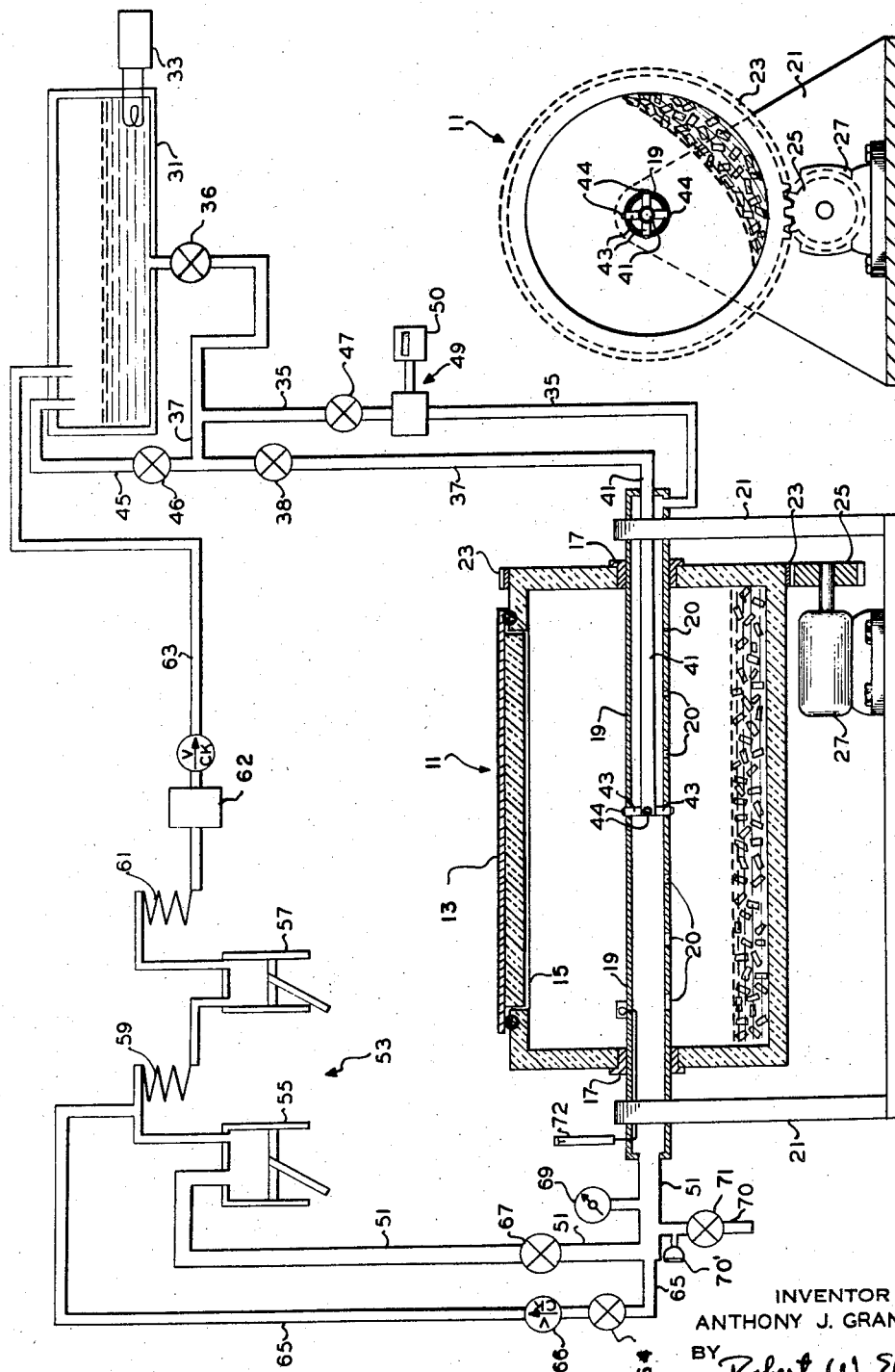
INVENTOR
ANTHONY J. GRANATA
BY Robert W. Ely
ATTORNEY 2,881,571
Patented Apr. 14, 1959

2,881,571

REMOVING FINS FROM MOLDED PRODUCTS

Anthony J. Granata, Locust Valley, N.Y., assignor to Air Reduction Company, Incorporated, New York, N.Y., a corporation of New York Application October 18, 1955, Serial No. 541,194

8 Claims. (Cl. 51—164)

This invention relates to the removal of flash or fins from molded rubber articles and other articles made of similar materials.

It is well known in the art to remove the flash or projections, which result from molding, from molded rubber articles by tumbling the articles, admixed with solid carbon dioxide which is snowed into or added as solid pieces to rotatable barrels. The very cold solid carbon dioxide or Dry Ice, when conditions are suitably controlled, embrittles the thin flash and the flash is broken off cleanly by abrasive action between the articles, without harm to the actual articles. This method is disclosed in the Hanrahan U.S.Patent No. 2,682,732 and the Kopplin U.S. Patent No. 2,380,653. There is, of course, an appreciable time requirement in this method of embrittling because much of the heat transfer is through the gas between the Dry Ice and the articles. Hence, this method is inherently slow.

The primary object of the instant invention is to provide an improved carbon dioxide method and means for removing flash from molded rubber articles by embrittling and removing the flash more rapidly than in prior conventional practices.

The foregoing object is accomplished in the preferred embodiment of the invention by pressurizing a tumbling barrel containing the articles to above 5.11 atmospheres and introducing cold liquid carbon dioxide as liquid into the barrel, whereby flash on the molded articles is chilled rapidly by the cold liquid carbon dioxide as the barrel is rotated. The pressure on the liquid is next decreased to about atmospheric, causing the liquid to evaporate and hence further cool the articles. The agitated liquid carbon dioxide soon changes to vapors and snow interspersed among the articles and then abrasive action among the tumbling articles causes removal of the embrittled flash.

Other objects, along with the advantages and features of the invention, will be apparent from the following detailed description of the preferred embodiment of the invention and the accompanying drawing, in which:

Figure 1 is a schematic showing, with parts in cross section, of the preferred apparatus for accomplishing the method of the instant invention with the tumbling barrel enlarged; and, Figure 2 is a schematic transverse view of the tumbling barrel with parts omitted and shows the interior spray and the drive arrangement.

Referring now to Figure 1 of the drawing, the preferred apparatus will be described. The cylindrical insulated tumbling barrel 11 basically is of conventional design, well known in the art. Therefore, it has been shown schematically and will not be described in detail. The barrel differs decidedly in that it is suitably constructed to withstand and retain a relatively high pressure therein, at least slightly in excess of 60.4 p.s.i.g. or 75.1 p.s.i.a (5.11 atmospheres) and to provide for the introduction of liquid carbon dioxide. A quick-opening cover 13 closes in a gas-tight manner a large opening 15 which provides for the introduction of the rubber molded articles. Cover 13 is hinged at one long side to the barrel and has conventional rapidly-operated locking means (not shown) such as disclosed in U.S. Patent No. 2,689,713. The cover 13 and the gas-tight bearings 17, at each of the junctions of the side walls of the barrel and its stationary axial support shaft 19, are preferably constructed and arranged to provide a barrel which will resist a pressure of about 125 p.s.i.g. Resistance of a pressure of about 90 p.s.i.g. is required in any event so that the triple point pressure (5.11 atmospheres) of carbon dioxide can be safely attained. Shaft 19 has several openings through the bottom thereof which permit rapid charging of liquid carbon dioxide. The barrel 11 is rotatably supported by its bearings 17 on axial shaft 19 which, in turn, is rigidly mounted exteriorly of each end of the barrel in support brackets 21. Means for rotating the barrel in order to effect the desired tumbling are shown schematically and comprise a peripheral gear 23 which is attached to the right, outer surface of the barrel and a drive gear 25 which meshes with gear 23 and is driven by a variable-speed electric motor 27. Suitable conventional control items, such as timers for regulating the period of tumbling, have not been shown in the interests of clarity in presenting the instant invention. Within the barrel, a quantity of liquid carbon dioxide, having therein molded rubber articles which require the removal of flash, is shown schematically.

The means for supplying refrigerated liquid carbon dioxide to the barrel 11 comprises a conventional insulated storage tank 31 having a refrigeration system 33 and insulated valved conduits leading from the tank to the barrel. The tank 311 and refrigeration system 33 are constructed so as to store and provide a supply of gaseous and liquid carbon dioxide at about 0° F. and 300 p.s.i.g. In the illustrated arrangement, the barrel is constructed to receive two flows of liquid carbon dioxide, one flow through main conduit 35 (directly connected to the tank 31) and another flow through branch conduit 37 connected to main conduit 35. Conduit 35 has a shut-off valve 36 which is located therein upstream of branch 37. The branch conduit 37 has a manual valve 38 and connects to a pipe 41 which extends from the exterior of right end of hollow shaft 19 to the center of the part of shaft 19 within the barrel 11. At this center location, the pipe 41 has four equally-spaced, laterally-extending spray pipes 43 which project through the wall of shaft 19 and have spray orifices 44. By this spider arrangement (see Figure 2) means are provided for spraying carbon dioxide toward most parts of the barrel chamber. It is to be noted that pipes 41 and 43 are not shown in cross section in Figure 1 in the interests of clarity. The branch conduit 37, pipe 41, and pipes 43 are used initially for charging carbon dioxide into the barrel, in order to pressurize the interior of the barrel. This initial charging is suitably controlled by manual valve 38 in a manner to be described. A vapor conduit 45 having valve 46 extends between the vapor space of the tank 31 and branch conduit 37 and provides alternate means for pressurizing the barrel.

The main conduit 35 leads from tank 31 to the right end of the hollow shaft 19 where a suitable connection is made to the interior thereof. This conduit 35 has interposed therein a manual valve 47 and a quantity measuring device 49 having a meter 50. This construction serves as the means for charging the tumbling barrel with the charge of liquid carbon dioxide, as will be described.

Referring now to the other end of the barrel 11, it can be seen that a large gas conduit 51 is connected to the interior of shaft 19 and extends to a carbon dioxide liquefying system 53 which is comprised of two compressors 55, 57, an intercooler 59, a condenser 61 and suitable flow connections. A conventional purge device 62 is connected to the bottom of condenser 61 for the purpose of purging air which may be trapped in the system. The components of the liquefying apparatus are conventional devices and are so selected to perform the functions of rapidly withdrawing gaseous carbon dioxide from the barrel and liquefying it for delivery through discharge pipe 63 having a check valve to tank 31, under the conditions herein described. The compressors have suitable check valves (not shown) for effecting the desired operation. The large gas conduit 51 has a by-pass conduit 65 which connects to the conduit leading to the high pressure compressor 57 from compressor 55. Conduit 65 has a manual valve 64 and a check valve 66.

The by-pass conduit 65 provides the means for by-passing the first stage compressor 55. Gas flows to compressor 57 when valve 67 in conduit 51 is closed and the pressure in the barrel exceeds 65 p.s.i.g. because check valve 66 opens above 65 p.s.i.g. A suitable pressure gauge 69 is also provided for determining the pressure in the barrel 11. A valved vent 70 having a safety bursting disc 70' or other pressure release device and manual valve 71 is also provided and is connected into pipe 51. A thermometer 72 provides the means for determining the temperature within the barrel. The safety device 70' is constructed to open when the pressure in the barrel exceeds about 85 p.s.i.g.

In Figure 2 which is a schematic transverse showing of the barrel the articles and carbon dioxide are shown as "climbing up" the side wall of the barrel as will occur when the barrel is rotated rapidly. The flow means 41, 43 in the barrel appear, and it can be appreciated that the discharge orifices 44 of the spray pipes 43 forming the spider construction within the hollow support shaft 19 spray in a conical fashion the carbon dioxide to most of the interior of the barrel. The operative relation between the peripheral gear 23 on the barrel and the motor-driven spur gear 25 also is shown. The cover 13 has been omitted in the interests of clarity.

In operation, the barrel 11 is charged with a predetermined quantity of a given type of molded rubber articles or similar items and then is sealed by securing cover 13. At this point, the liquefying apparatus 53 and motor 27 for rotating the barrel are not operating and valves 36, 38, 46, 47, 64, 67, and 71 are closed. At the time of sealing of the barrel, the barrel is at about room temperature or lower if a tumbling operation has just been completed and at atmospheric pressure or only slightly above. The articles will usually be at about room temperature and constitute a relatively large heat source.

In accordance with the instant invention, it is necessary to pressurize the interior of the barrel and carbon dioxide is discharged into the barrel for this purpose. The carbon dioxide for pressurizing is obtained from tank 31, where it is maintained at 0° F. and about 300 p.s.i.g., by opening valves 36 and 38. The liquid carbon dioxide flows through part of conduit 35 to conduit 37 and pipe 41 and discharge orifices 44. The liquid then discharges through orifices 44 into the interior of the barrel which is at about atmospheric pressure. Under these conditions, the liquid is discharged as vapor and solid particles. The relatively small quantity of carbon dioxide required for pressurizing is sprayed as four flat conical streams to most parts of the barrel and a rapid pressure build-up and some precooling of the articles is accomplished.

Simultaneously with, or shortly after, the opening of valves 36 and 38, the barrel preferably is rotated by starting motor 27 so that heat exchange between the dispersed solid and gaseous carbon dioxide and the rubber articles is more rapidly effected with the result that pressurization of the barrel and cooling of the articles is achieved more rapidly. In any event, rotation of the barrel is commenced at the start of the liquid charging step, thereinafter described.

It is to be noted that some of the carbon dioxide which pressurizes the barrel also serves to cool the articles since the produced solid particles at about −110° F. will contact the articles. Any residual solid carbon dioxide will absorb heat from the initial part of the subsequent liquid charge at 0° F.

When the operator notices that the pressure in the barrel, as indicated by gauge 69, reaches about 55 p.s.i.g., he opens valve 64 and starts the high stage compressor 57. After some further period of time, so that pressure builds up, gas is withdrawn through check valve 66 from the barrel when the pressure of the gas exceeds about 65 p.s.i.g. Thus, the apparatus is so operating that, during subsequent liquid charging of the barrel and chilling with liquid carbon dioxide only a low degree of pressurization which is in excess of that required for liquid carbon dioxide is maintained. In this manner, the transfer of heat from the articles to the carbon dioxide is more rapidly effected than would occur at pressures appreciably in excess of 65 p.s.i.g., since the liquid carbon dioxide tends to approach −65° F. at a pressure of 65 p.s.i.g. This preferred pressure is only slightly in excess of triple point pressure (60.4 p.s.i.g.) so that the temperature is lowered more rapidly toward −69.9° F., the triple temperature of carbon dioxide. However, it is to be understood that the pressure can be maintained appreciably above 60.4 p.s.i.g. if it is not desired to have the liquid carbon dioxide as cold as possible. For instance, if the pressure is maintained at 80 p.s.i.g., the temperature of liquid carbon dioxide will approach −60° F.

When the pressurization of the barrel is suitable and hence gauge 69 indicates a pressure of about 65 p.s.i.g., the barrel is so conditioned that liquid carbon dioxide can be charged into the barrel as liquid without the formation of vapor and snow. At this point, valve 38 will be closed and valve 47 will be opened. This operation permits the step of charging a predetermined quantity of cold liquid carbon dioxide into the rotating tumbling barrel which is maintained at about the triple point pressure. This cold liquid flows from tank 31 through conduit 35 having valve 47 and meter 49 to the interior of hollow shaft 19 and then into the bottom of the barrel through longitudinal-spaced openings 20 having increasing diameters. This results in liquid-to-solid heat exchange between the cold liquid and the charge of rubber molded articles, both of which are being tumbled whereby rapid chilling is achieved.

It is to be noted that, by tumbling during charging, less time will be required to effect the chilling than would be required if the barrel were not rotated and if mere immersion in a stationary pool were done, since the cold liquid and articles will be brought effectively into contact with the each other by agitation. It is apparent that, during liquid charging, the temperature exceeds 69.9° F.

The quantity of liquid and the period of time of liquid tumbling for chilling will vary depending upon the type and quantity of rubber articles, the amount of cooling achieved during pressurization, and the residual amount of solid carbon which is left from the pressurizing step, if any. It is to be appreciated that the time for pressurizing and liquid tumbling is relatively brief when compared to the entire process of the instant invention.

When the predetermined quantity of cold liquid at 0° F. has been charged into the rotating barrel as indicated on register 50, the operator closes valve 47 and hence the liquid flow from tank 31 is stopped. Due to the removal of the vapors and the maintained pressure, the liquid carbon dioxide will approach −65° F. When contact with the cold liquid has chilled the flash on the molded rubber articles to the desired degree so that subsequent further cooling of the flash to the desired final embrittlement can be accomplished very rapidly, the operator will open large valve 67 in large conduit 51, close valve 64, and start the low stage compressor 55. This compressor is so constructed as to withdraw gas through conduit 51 from the barrel when the gas pressure is in excess of about 17 p.s.i.a. or 2.3 p.s.i.g. In this manner, and in view of the size of pipe 51, the pressure in the barrel is rapidly decreased with the result that the agitated liquid boils violently, decreases in temperature further toward −69.9° F. and then is rapidly converted to very cold, fine snow and to vapors. It is to be noted that the snow will be intimately admixed with the articles, rather than snowed on top of the articles and then mixed by tumbling. The snow resulting from the flashing of the liquid tends to cool the articles to about −110° F., which is the temperature of the snow at about 17 p.s.i.a. Thereafter, tumbling to remove flash is effected. This dry tumbling causes the final embrittlement of the flash or fins and the removal of the fins due to abrasive action among the molded rubber articles. It is apparent that cooling during pressurizing, chilling with cold liquid, further chilling with boiling liquid carbon dioxide and then final cooling and maintenance of the desired low temperature with intimately mixed solid carbon dioxide results in a method which is appreciably faster than conventional commercial practice.

After the desired "dry" tumbling has been done and usually most of the solid carbon dioxide resulting from the preferred quantity of charge has been vaporized and recovered by the liquefying apparatus 53, the operator stops motor 27 and hence rotation of the barrel. In practice, the barrel is stopped, by conventional means not shown, in such a position that the de-flashed rubber articles can be easily removed through opening 15. Shortly after stopping the barrel, the compressors 55 and 57 are stopped and then the cover 13 is opened. Since the pressure within the barrel is low (about 17 p.s.i.a.), opening of cover 13 normally presents no problems. If there is a delay and gauge 69 indicates an undesirable pressure in the barrel, the valve 71 in vent line 70 can be temporarily cracked to obtain the desired pressure by releasing gas from the barrel. The deflashed rubber articles are then removed and the cycle is repeated.

In tests made using the instant process, it has been possible to greatly reduce the time required when compared to prior practice involving snowing. For example, the time required for deflashing a given type and a given quantity of molded rubber articles was reduced to less than half the time previously required when only snowing was done. About one minute was required for pressurizing and cooling, two minutes for liquid charging and chilling, and four minutes for dry tumbling.

It is to be understood that in some cases the preferred quantity of liquid for chilling and conversion to snow may not, when converted to solid, be sufficient for effecting the proper embrittlement during dry tumbling. In these cases, the barrel can be charged with snow by opening valve 38 in response to the temperature.

It is believed that the manner in which the carbon dioxide is recovered is obvious from the above description. The purge device 62 provides the means for eliminating any air which may enter the barrel and hence get into the means for recovering in liquid phase the carbon dioxide which is used in the barrel.

Another method of pressurizing the barrel involves the use of the gas from the liquid carbon dioxide storage tank 31. Thus, with valve 36 closed, valves 46 and 38 are opened and gas at about 300 p.s.i.g. is admitted through orifices 44. The admission of this gas into the barrel chamber which is at about atmospheric pressure causes the formation of snow. The end result as to cooling and pressurizing the barrel is comparable to the result above described.

It is to be understood that rubber is one form of several rubber-like materials which can be called cold-hardenable elastomers and can be deflashed in accordance with the present invention.

It is apparent that the amount of liquid which is added can be reduced and/or the quantity of articles increased whereby the total refrigeration effected by the liquid charge will only be sufficient to reduce the final temperature of the molded articles to some value appreciably above −110° F. Obviously, the advantage of effecting rapid initial chilling by liquid contact will be retained. It may be necessary, however, to snow in more carbon dioxide through valve 38 in order to maintain the desired temperature as recorded on the thermometer 72. It is also possible to charge liquid through nozzles 44, after pressurizing.

Under some circumstances, it may be desirable to achieve the advantages of liquid carbon dioxide chilling and cooling but to convert only part of the liquid to vapor and snow. In this case, a suitable dip tube and a high pressure liquefied gas pump can be provided for returning some of the liquid carbon dioxide used for chilling to the storage tank.

The proper tumbling time and most satisfactory temperature or quantity of liquid charge for particular articles can be readily determined by preliminary tests and will vary in accordance with the size and material of the articles and the thickness of the flash.

In summary, the instant invention features pressurizing the interior of a tumbling barrel and precooling molded rubber articles therein by discharging carbon dioxide snow and vapors into the barrel. Thereafter, the rubber articles are contacted with cold liquid carbon dioxide whereby the articles are rapidly chilled. Next, the liquid is boiled, further cooling the articles, and converted to snow and vapors with fine snow interspersed among the articles by decreasing the pressure on the liquid. Finally, the articles and fine, cold snow are tumbled so that embrittled fins or mold projections on the molded rubber articles are removed by abrasive action.

From the foregoing, it is apparent that the present invention provides rapid initial cooling due to the liquid-to-solid heat exchange and also provides improved final cooling because fine particles of snow are interspersed among the articles. Each of these features contribute significantly in providing improved economy of time and refrigerant.

While a specific embodiment of the invention has been described, it will be understood that changes may be made by those skilled in the art without departing from the invention as set forth in the following claims.

I claim:

1. The method of removing flash from molded rubber-like products comprising, inserting said articles into a pressurized chamber, providing a pressure in said chamber above the triple point pressure of carbon dioxide, contacting said articles with a quantity of cold liquid carbon dioxide to cool said articles, lowering still further the temperature of said articles and said liquid while in contact therewith by decreasing the pressure in said chamber sufficiently to convert substantially all of said liquid carbon dioxide to vapors and solid particles, and tumbling said cooled articles in said chamber whereby embrittled flash is removed from said articles.

2. The method according to claim 1 and being further characterized in that said articles and said liquid carbon dioxide are agitated while said articles are cooled and said liquid carbon dioxide is converted to vapors and solid particles.

3. The method of removing flash from molded rubber-like articles comprising, inserting said articles into the chamber of a tumbling barrel, introducing carbon dioxide vapor and snow into said chamber, the amount of said vapor and snow being sufficient to increase the pressure in said chamber to above the triple point pressure of carbon dioxide, introducing liquid carbon dioxide into said chamber and in contact with said articles whereby solidto-liquid heat exchange occurs between said liquid and said articles, lowering the temperature of said liquid carbon dioxide by reducing the pressure thereon sufficiently to convert said liquid carbon dioxide to vapor and solid particles and thus further cool said articles by direct contact with said solid particles, and tumbling said articles so that the embrittled flash is removed from said articles.

4. The method of freezing molded articles while subjected to superatmospheric pressure which comprises introducing said articles in a chamber adapted to withstand a pressure of at least 65 p.s.i.g., providing a pressure in said chamber above the triple point pressure of carbon dioxide, introducing a predetermined amount of liquid carbon dioxide into said chamber to cool said articles by solid-to-liquid heat exchange, rapidly decreasing the pressure in said chamber so that substantially all the liquid carbon dioxide is converted to snow and vapor whereby said articles are rapidly frozen while at superatmospheric pressure.

5. The method according to claim 4 and being further characterized in that said articles are tumbled while in contact with the carbon dioxide.

6. In the art of freezing molded articles while subjected to superatmospheric pressures and contained in a pressurized chamber, the improvement comprising providing a pressure in said chamber above the triple point pressure of carbon dioxide, introducing a predetermined amount of liquid carbon dioxide into said chamber, cooling said articles by direct contact with liquid carbon dioxide, and then converting at least part of said liquid carbon dioxide to vapor and solid particles to effect direct contact of said articles and said solid particles, whereby said articles are rapidly frozen while at superatmospheric pressures.

7. Apparatus for removing flash from molded rubber-like articles comprising a container of cold liquid carbon dioxide, a rotatable tumbling barrel connected to said container by a conduit, said barrel adapted to withstand a pressure of more than 5.11 atmospheres and having a chamber for said articles, said conduit adapted to discharge a predetermined quantity of cold liquid carbon dioxide from said tank into said chamber, means associated with said barrel for raising the pressure in said chamber to above 5.11 atmospheres whereby said liquid carbon dioxide can be discharged as liquid in said chamber, valve control means for releasing the pressure in said barrel when the pressure exceeds a predetermined value above 5.11 atmospheres, and pressure reducing means connected to said tumbling barrel and adapted to rapidly reduce the pressure in said tumbling barrel whereby liquid carbon dioxide in said container can be flashed to vapor and solid particles of carbon dioxide.

8. Apparatus for freezing molded articles while subjected to superatmospheric pressure comprising a container for said articles and adapted to withstand a pressure above the triple point pressure of carbon dioxide, means associated with said container for increasing the pressure therein to above said triple point pressure, liquid carbon dioxide supply conduit connected to said container and adapted to discharge a predetermined quantity of liquid carbon dioxide into said container when the pressure therein is above said triple point pressure, means for releasing the pressure in said barrel when the pressure exceeds a predetermined value above said triple point pressure, and means for quickly reducing the pressure in said container to below said triple point pressure so that liquid carbon dioxide in said container will change to vapors and solid particles of carbon dioxide.

References Cited in the file of this patent

UNITED STATES PATENTS

| | | |
|---|---|---|
| 2,137,902 | Walter | Nov. 22, 1938 |
| 2,421,753 | Joyce | June 10, 1947 |
| 2,533,653 | Winkeljohn | Dec. 12, 1950 |
| 2,509,041 | Lubenow | May 23, 1950 |
| 2,682,732 | Hanrahan | July 6, 1954 |